United States Patent [19]

Farkas et al.

[11] Patent Number: 4,459,146
[45] Date of Patent: Jul. 10, 1984

[54] ELECTRONIC CONTROL SYSTEM IN A GLASSWARE FORMING MACHINE

[75] Inventors: Daniel S. Farkas, Toledo; Joseph F. Billmaier, Maumee, both of Ohio

[73] Assignee: Owens-Illinois, Inc., Toledo, Ohio

[21] Appl. No.: 409,212

[22] Filed: Aug. 18, 1982

[51] Int. Cl.³ ............................................. C03B 9/40
[52] U.S. Cl. ........................................ 65/29; 65/159; 65/163; 65/164; 65/DIG. 13; 364/473; 364/476
[58] Field of Search ................... 65/29, 159, 163, 164, 65/DIG. 13; 364/473, 476

[56] References Cited

U.S. PATENT DOCUMENTS 3,594,146 7/1971 Trudeau ............................ 65/164 X
4,338,115 7/1982 Farkas .............................. 65/159 X

FOREIGN PATENT DOCUMENTS 56-123014 9/1981 Japan .................................. 364/476

Primary Examiner—Arthur D. Kellogg
Attorney, Agent, or Firm—Gerald T. Welch; Myron E. Click

[57] ABSTRACT

The machine has a plurality of individual glassware forming sections each having a plurality of glassware forming mechanisms and means for distributing gobs of molten glass to each of the individual sections in an ordered sequence over one machine cycle consisting of a fixed number of clock pulses by cycling the forming mechanisms in a predetermined sequence of forming steps. Each individual section has an electronic control system responsive to each clock pulse for providing a load signal and forming signals to actuate the forming and a circuit for providing a gob load signal in response to a load signal from any one of the control systems and means responsive to the absence of a gob load signal for deflecting a gob from being distributed to an individual section. The machine has means for providing an operation pulse each time the control system provides forming signals to the forming mechanisms and means for providing a monitoring signal at a first binary state when a first one of the operation pulses is applied and changing to the second binary state if no operation pulse occurs within a stall-period of time after the first operation pulse. Each system also comprises means for enabling the load signal and the forming signals when at the first binary state and for inhibiting the load signal and the forming signals when at the second binary state so that the gobs of molten glass will not be distributed and the mechanisms will return to a safe condition.

10 Claims, 6 Drawing Figures

ELECTRONIC CONTROL SYSTEM IN A GLASSWARE FORMING MACHINE

FIELD OF THE INVENTION

The present invention relates generally to machines for forming glassware articles from gobs of molten glass and more particularly to a method and apparatus for electronically controlling the individual sections of the glassware forming machine.

BACKGROUND OF THE INVENTION

The individual section or IS glassware forming machine is well known and has a plurality of individual glassware forming sections, each of which has a plurality of glassware forming mechanisms. Typically, the individual sections are fed from a single source of molten glass which feeds and sequentially distributes gobs of molten glass to the individual sections in an ordered sequence over one machine cycle consisting of a fixed member of clock pulses to form the gobs into glassware articles by cycling the forming mechanisms in a predetermined sequence of forming steps. An electronic control system is associated with each individual section and responsive to each clock pulse for providing a load signal and a plurality of forming signals to actuate the forming mechanisms during the machine cycle. A gob load circuit provides a gob load signal in response to a load signal from any one of the control systems and means responsive to the absence of the gob load signal for deflecting a gob to prevent it from being distributed to an individual section. The sections are operated in synchronism at a relative phase difference such that one section is receiving a gob while other sections are performing various ones of the intermediate forming steps.

Modern electronic control systems utilize a digital computer such as, for example, those disclosed in U.S. Pat. Nos. 3,905,793 and 4,152,134, as opposed to discrete components such as, for example, that disclosed in U.S. Pat. No. 3,762,907. A section operator consol or SOC is provided at each individual section to enable a machine operator to change the timing data for any of the forming steps. The SOC is connected to the individual section computer, reads the timing change and replaces the corresponding previous timing data. Not only does the utilization of the computer provide a means for automatically changing the sequence of the forming steps and controlling whether or not an individual section is to receive gobs, but also provides a means for additional programming flexibility when compared to the inflexibility of discrete component designs. Despite all the advantages of the programming flexibility offered by the utilization of a computer, the possibility still exists that the computer itself might "stall" causing the forming signals and the load signal to freeze and leave the individual section in an unsafe condition for the machine operator. More specifically, if the operator desired to prevent gob delivery to a particular section and if the computer stalled during an immediately preceding gob delivery to another section causing its load signal to freeze on, that load signal would cause a gob load signal to remain on despite the operator's attempt to prevent gob delivery. In such case, the operator could be seriously injured by a hot gob being delivered when he thought he had prevented such delivery.

SUMMARY OF THE INVENTION

The present invention is directed to a method and apparatus for electronically controlling the individual section of a glassware forming machine. In the glassware forming machine described above, each electronic control system first comprises means for providing an operating signal each time the control system provides a plurality of forming signals to the forming mechanisms. The control system next comprises means responsive to the operating means for providing a monitoring signal at a first binary state when a first one of the operation signals is applied thereto and changing to the second binary state if no operation signal occurs within a predetermined stall-period of time after said first operation signal. The control system finally comprises means responsive to the monitoring means for enabling the load signal and the forming signals from the control system when the monitoring signal is at the first binary state and for inhibiting the load signal and the forming signals from the control system when the monitoring signal is at the second binary state. The operation signal is derived from a software instruction to the computer so that a stall condition would be indicated in its absence. Although the monitoring means is not known in the art and has not been used in conjunction with control systems of glassware forming machines, the assignee of the present invention has used similar monitoring means for other systems. In this case, it is responsive to the operating means to change the monitoring signal to the second binary state if no operation signal occurs within the stall-period which would indicate that the computer itself had stalled. When the monitoring signal is changed to the second binary state, all outputs of the control system including the load signal and the forming signals are inhibited to turn off the gob load signal. It is, therefore, an object of the invention to prevent gobs of molten glass from being distributed to the individual sections and to return the forming mechanisms to a safe condition in the event the computer of the control system is subject to a stall condition.

DETAILED DESCRIPTION OF THE INVENTION

Figure 1:
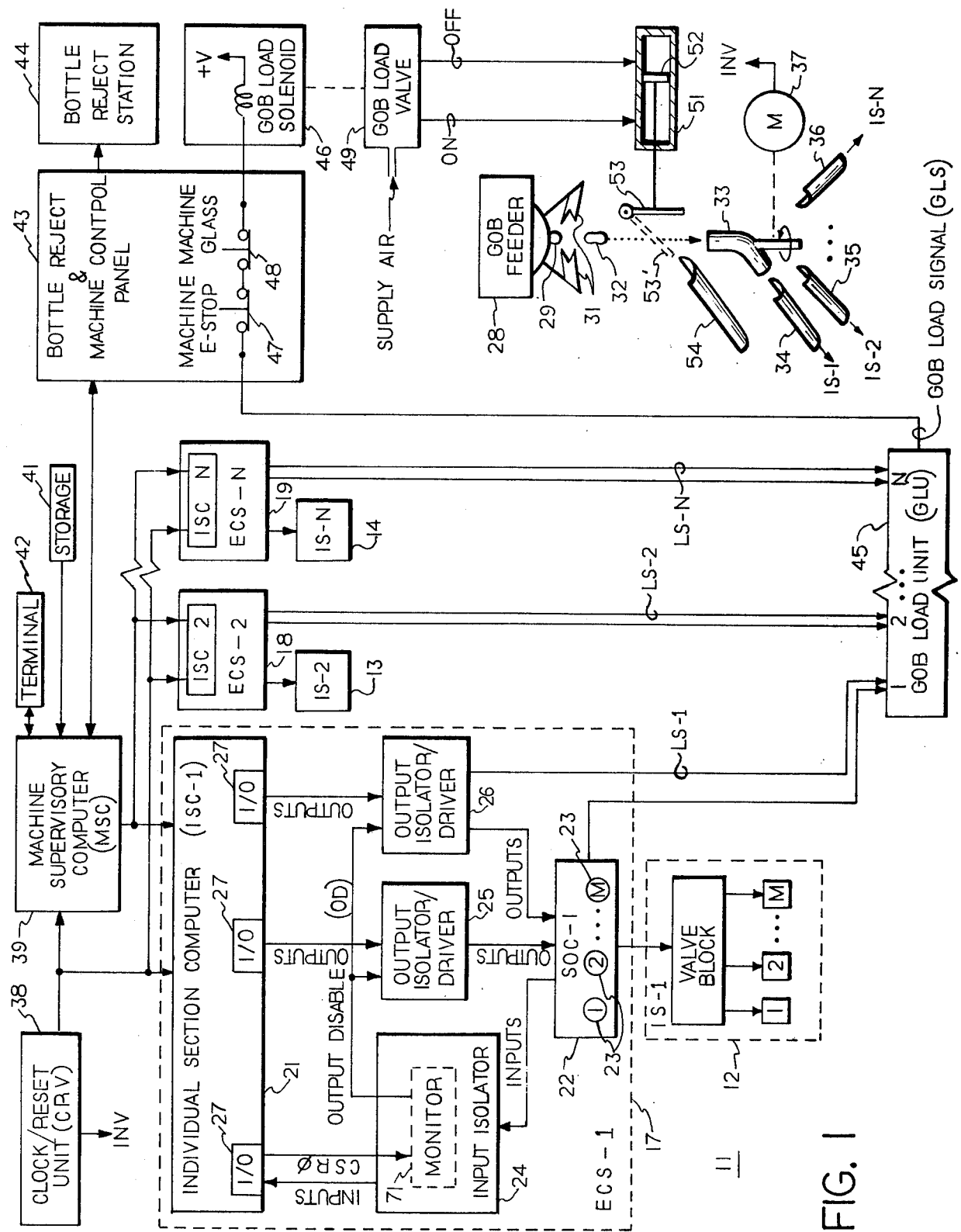
FIG. 1 is a block diagram and schematic representation of a glassware forming machine within which the invention operates.

Referring to FIG. 1, a block diagram of a glassware forming machine is shown generally at 11. The glassware forming machine 11 comprises a plurality of individual glassware forming sections (IS), one through N, such as IS-1, IS-2 and IS-N indicated at 12, 13 and 14, respectively. Referring specifically to IS-1 12, each individual section (IS) includes a valve block 15 and a plurality of glassware forming mechanisms 16, one through M, connected thereto. The valve block 15 contains a plurality of valves for actuating corresponding forming mechanisms 16 in a predetermined sequence of forming steps in response to forming signals being applied to solenoids (not shown) electromechanically associated with the valves. The glassware forming machine 11 also comprises a plurality of electronic control systems (ECS), one through N, such as ECS-1, ECS-2 and ECS-N indicated at 17, 18 and 19, each of which is connected to an associated individual section 12, 13 and 14, respectively, to provide forming signals to the valve blocks 15 thereof. Referring specifically to ECS-1 17, each electronic control system (ECS) includes an individual section computer (ISC), e.g., ISC-1 21, and a section operator circuit (SOC), e.g., SOC-1 22. The SOC-1 22 provides the forming signals to the solenoids of the valve block 15 and is used by an operator to adjust the timing of the forming mechanisms 16. The SOC-1 22 is also used to control the operating conditions of IS-1 12. When IS-1 12 is on, it is designated to be in the RUN condition and, when IS-1 12 is off, it is designated to be in the SAFE condition. When a section is in the SAFE condition, the forming mechanisms are all moved to a designated position which is safe for the operator. If a section is in the SAFE condition, the operator can switch to a manual mode wherein its solenoids of the valve block 15 can be individually controlled by a plurality of switches 23 which are provided in the SOC-1 22. The inputs of the ISC-1 21 are connected to the SOC-1 22 via an input isolator circuit 24 and the outputs of the ISC-1 21 are connected to the SOC 22 via output-isolator/driver circuits 25 and 26. The ISC-1 21 can be, for example, an LSI-11 computer manufactured by the Digital Equipment Corporation of Maynard, Mass. The input and output ports for the ISC-1 21 can be provided by utilizing model DRV-11 parallel input/output interface boards 27 also manufactured by the Digital Equipment Corporation.

The individual sections are fed from a single source of molten glass which feeds and sequentially distributes gobs of molten glass to the individual sections. More specifically, a gob feeder 28 forces molten glass 29 through a pair of orifice shears 31 which when actuated forms a gob 32. The gob 32 falls freely as indicated by a dotted line to an oscillating scoop 33 which distributes the gob 32 to IS-1 12 via its associated trough 34. Successive gobs are fed to the other individual sections via their associated troughs 35 and 36 in an ordered sequence and at a predetermined rate proportional to the speed of a gob distribution drive motor 37. The drive motor 37 is energized by a supply of variable frequency power (INV) supplied by an inverter and mechanically drives the oscillating scoop 33. Since the speed of the drive motor 37 is determined by the frequency of the power supply INV, the cycle time of each individual section and, therefore, that of the machine 11 is determined by the gob distribution rate. Typically, the forming steps performed by the forming mechanisms 16 of each individual section are timed by dividing the entire machine cycle and each section cycle into 360°. Also, each section cycle is referenced to the start of the machine cycle with an individual section offset, as well as the sequence of forming steps therein, by a number of degrees to compensate for the difference in time during the machine cycle that gobs of molten glass are being distributed to each individual section. A clock/reset unit (CRU) 38 is also responsive to the frequency of the inverter power (INV) and provides 360 pulses per machine cycle for any predetermining gob distribution rate. The CRU 38 also provides a reset signal after 360° of clock pulses to define the end and beginning of successive machine cycles. The CRU 38 can be an encoder or pulse generator of the type disclosed in U.S. Pat. No. 4,145,204 and U.S. Pat. No. 4,145,205, both of which are assigned to the assignee of the present invention and both of which are hereby incorporated by reference.

A machine supervisory computer (MSC) 39 is connected to each ISC, e.g., ISC-1 21, of each ECS, e.g., ESC-1 17. Initially, the MSC 39 loads a control program and timing data from a storage device 41 into each ISC. The operator uses a terminal 42 to select the particular timing data which is to be loaded into each ISC, there being a different set of timing data for each one. The MSC 39 and each ISC receive the timing pulses from the CRU 38 to establish the 360° timing for the machine cycle. After the MSC 39 loads each ISC, the CRU 38 generates a clock signal thereto which provides a reference for timing the machine cycle and the section cycle comprising the sequence of forming steps to be performed by each IS. More specifically, the ISC-1 21 provides a plurality of the forming signals through the SOC-1 22 to the solenoids of the valve block 15 for actuating the forming mechanisms 16 in the predetermined sequence of forming steps to form the articles of glassware in accordance with the control program and timing data currently stored in the ISC-1 21. The MSC 39 is also connected to a bottle reject and machine control panel 43 which is used by the operator to reject a particular article of glassware from a particular IS when it arrives at a bottle reject station 44. Details of the panel 43 and the reject station 44, as well as details relating to the MSC 39, are disclosed more specifically in U.S. Pat. No. 4,152,134 which is assigned to the assignee of the present invention and is hereby incorporated by reference.

Besides the forming signals, each ISC provides a load signal (LS) for a period of time corresponding to the machine cycle divided by the number of sections. For example, in a ten-section machine, the load signal (LS) for each section would have a duration of 36°. The load signal (LS-1) from the output board 26 of the ISC-1 21 and the other load signals (LS-2 through LS-N) from the other ISCs (ISC-2 through ISC-N) are all connected to a gob load unit (GLU) 45 which ORs all of the load signals to provide a gob load signal (GLS) to a gob load solenoid 46 via the machine control panel 43. The machine control panel 43 has a machine E-stop switch 47 and a machine glass switch 48 which the operator can use to interrupt the gob load signal (GLS) when desired. When the solenoid 46 is energized, it actuates a gob load valve 48 which enables a flow of supply air to a pneumatic line ON. When the solenoid 46 is not energized, the valve 48 returns to a normal position which enables a flow of supply air to a pneumatic line OFF. The pneumatic lines ON and OFF are connected to opposing sides of a dual-action gob load cylinder 51 containing a gob load piston 52 to which a gob reject flipper 53 is attached. When the solenoid 46 is energized, air pressure from the ON line forces the piston 52 to hold the flipper 53 in a retracted position enabling the gob 32 to be distributed to the oscillating scoop 33. However, when the solenoid 46 is deenergized, air pressure from the OFF line forces the piston 52 to extend the flipper 53 to the position indicated by the dashed line 53' to deflect the gob 32 to a cullet chute 54. When all of the individual sections of the machine 11 are running with glass in a RUN condition, the solenoid 46 is always energized and the flipper 53 is always retracted to enable distribution of the gobs. For the ten-section machine in the example above, a 360° gob load signal (GLS) is derived from ten successive 36° load signals (LS) to keep the flipper 53 retracted. However, when the operator stops one of the ten sections, a 324° gob load signal (GLS) is derived from nine successive 36° load signals (LS), while a 36° period exists where there is no gob load signal (GLS). This 36° gob load "OFF" period is synchronized with the proper IS, so that the gob destined for the stopped section will be diverted by the gob flipper 53 to the cullet chute 54. For example, referring to FIG. 2, if the operator stops IS-2 13, there would be no load signal (LS-2) and consequently, no gob load signal (GLS) as indicated by a dotted-dashed line so that the gob destined for the IS-2 13 is diverted.

As described above, the ISC provides the load signal (LS) from which the gob load signal (GLS) is derived. An extremely serious problem arises when the operator desires to stop one of the individual sections for some repair or maintenance. For example, if the operator stops the machine 11 while the gob load signal (GLS) is being derived from the load signal (IS-1) being provided by ISC-1 21 over a time period T1 which can be 36° as described in the example above and assuming that the duration of a machine cycle is approximately five seconds, T1 would equal approximately 500 milliseconds. Under normal conditions, ISN-1 21 would turn off its load signal (LS-1) and ISN-2 would not turn on its load signal (LS-2) so that no gob load signal (GLS) would be derived after the time period T1. As a result, the gob 32 would be diverted from the IS-2 13 as described above. If, however, ISC-1 21 "stalls" at a time t(2) before it turns off its load signal (LS-1), the load signal (LS-1) would remain on so that a gob load signal (GLS) indicated by a dashed line would be derived regardless of the fact that the ISC-2 did not turn on its load signal (LS-2). As a result, the operator could be seriously injured by a hot gob 32 being delivered to the IS-2 when he thought that he had prevented such a delivery. To remedy the situation, the present invention was devised to monitor each ISC for such "stalls" and to prevent the delivery of gobs and return the forming mechanisms 16 to a SAFE condition in response to a detected stall. It is to be noted that such stalls are difficult to define or categorize since they often involve an internal hardware problem that is usually remedied by simply replacing the device rather than repairing it. As such, detecting a stall is much more critical than identifying its source.

Figures 3, 4:
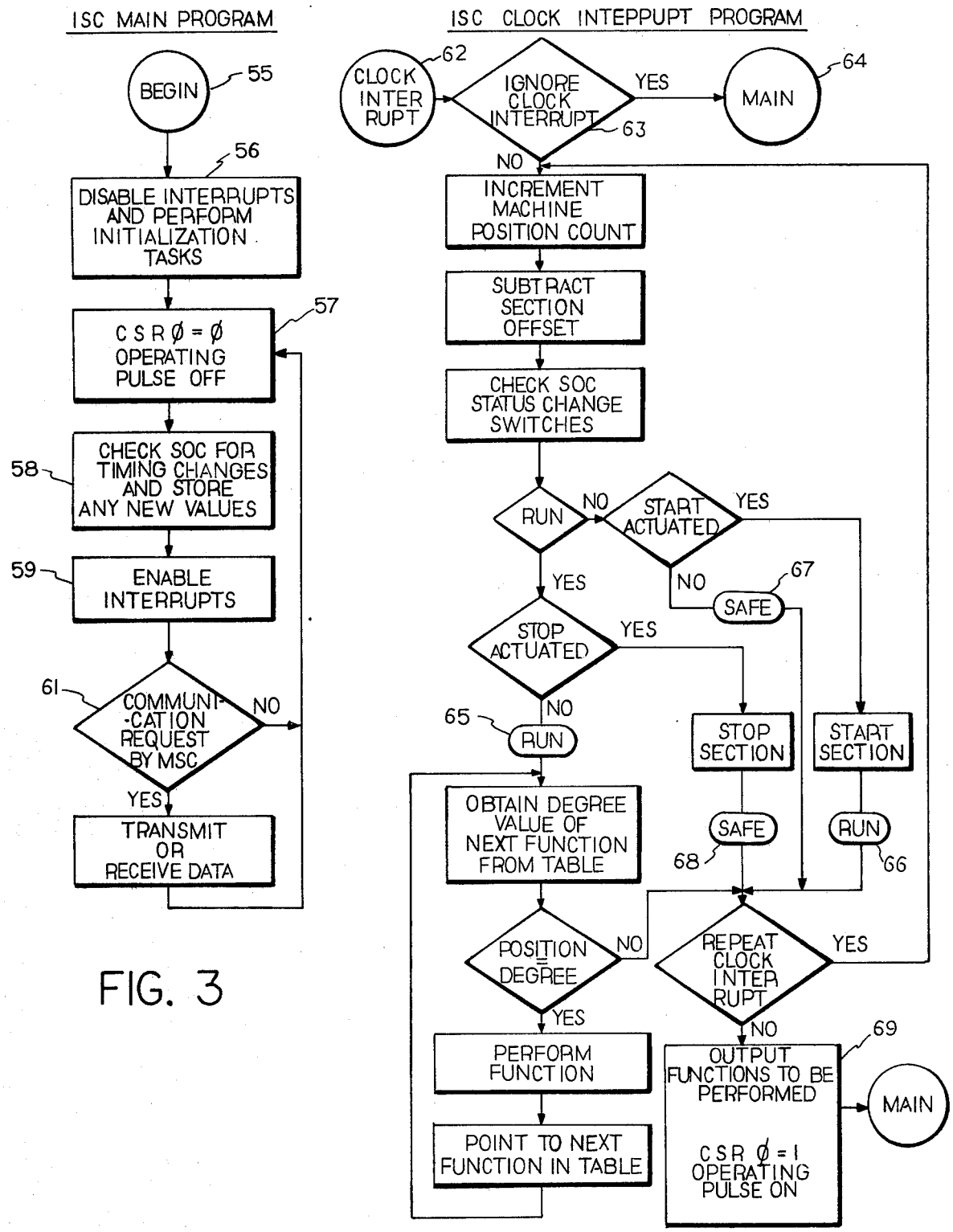
FIGS. 3 and 4 are simplified logic flowcharts representative of a portion of the programs run by the individual section computer of the glassware forming machine of FIG. 1 to provide an operating signal in accordance with the invention.

As described above, the MSC 39 loads a control program and timing data from the storage device 41 into each ISC. A control program and timing data are stored in the ISC-1 21 which provides the forming signals through the SOC-1 22 to the solenoids of the valve block 15 for actuating the forming mechanism 16 and also provides the load signal (LS-1) to the GLU 45. The control program for each ISC comprises an ISC main program and an ISC clock interrupt program as illustrated generally by logic flowcharts in FIGS. 3 and 4, respectively, which are representative of the operation of an ISC and which are explained in more detail in U.S. Pat. No. 4,152,134 which has already been incorporated herein by reference. The ISC main program is initiated at 55 and enters a processing function for disabling the interrupts at 56. Each of the input/output interface boards 27 of the ISC-1 21 contain a control/status (not shown) which provides a bit or operating signal (CSR∅) which can be loaded to read under program control. Thus, after the ISC main program disables the interupts at 56, it resets or zeros the operating signal (CSR∅) at 57. After the ISC main program checks the SOC for timing changes at 58, the program enters a processing function to enable interrupts at 59 which includes instructions to enable the ISC-1 21 to respond to the clock and reset pulses provided by the CRU 38. The program then enters a decision point at 61 to determine whether a communication has been requested by the MSC 39. Regardless of the decision made, the ISC main program loops back to 57 to reset the operating signal (CSR∅).

After the ISC main program has enabled the clock and reset interrupts, the ISC-1 21 will initiate the ISC clock interrupt program, which has a higher priority, each time a clock pulse is received from the CRU 38. Again, referring to the above example of a machine having a machine cycle of approximately five seconds, clock interrupt signals would occur at approximately 14 millisecond intervals, i.e., 360 pulses per machine cycle. Therefore, the ISC clock interrupt program is initiated at 62 in response to a clock interrupt signal and enters a decision point at 63 to determine whether to ignore the clock interrupt. As is discussed in U.S. Pat. No. 4,152,134, a late occurring reset pulse will require at least one clock interrupt to be ignored such that the program branches at "YES" and returns to the main program as indicated at 64. If the clock interrupt is not to be ignored, the program branches at "NO" and continues as described in U.S. Pat. No. 4,152,134. Regardless of the commands generated by the ISC clock interrupt program in the subsequent blocks, the IS-1 12 is in either the RUN mode as indicated at 65 and 66 or in the SAFE mode as indicated at 67 and 68 before outputting the forming functions for that degree and setting the operating signal (CSR∅), or equates it to one, at 69 and returning to the main program. Thus, referring back to FIG. 2, the ISC-1 21 provides a train of operation pulses 70, wherein each pulse is generated when the operating signal (CSR∅) is set by the ISC clock interrupt program and then reset by the ISC main program. If the ISC clock interrupt program continually returns to the ISC main program without stalling, the operation pulses 70 have a period T2 approximately equal to the time between successive clock interrupts, e.g., approximately 14 milliseconds as indicated in the example above.

Figure 2:
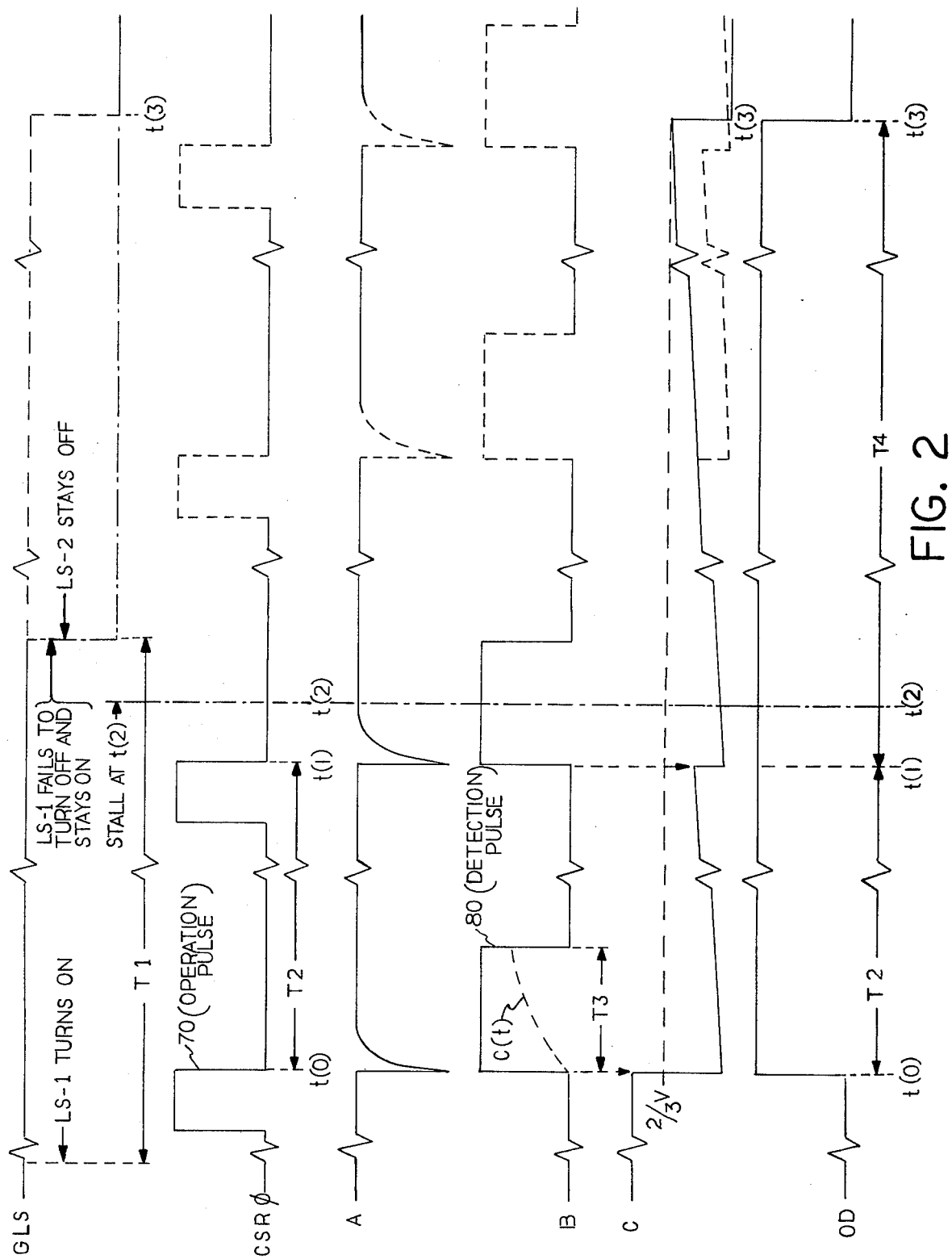
FIG. 2 is a series of time graphs illustrating the relative timing sequence of signals existing within the electronic control system and the gob load unit of the glassware forming machine of FIG. 1 to generate the appropriate gob load signal in accordance with the invention.
Figure 5:
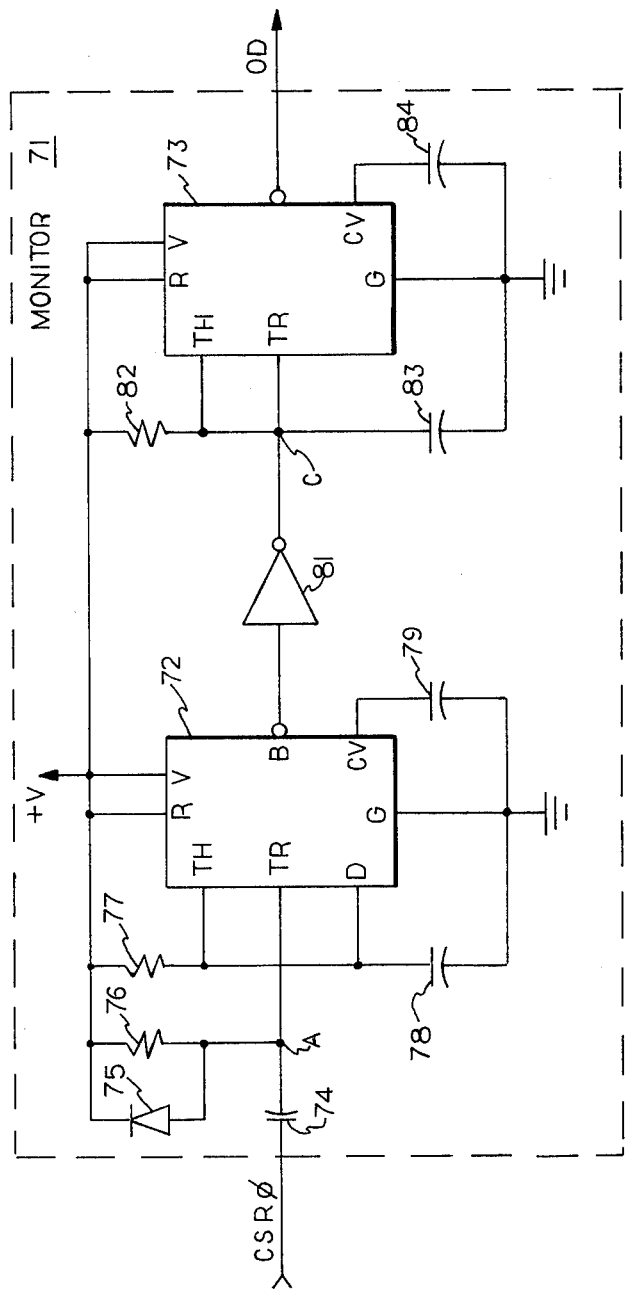
FIG. 5 is an electrical schematic of the monitor circuit shown as a block in FIG. 1 in accordance with the invention.

Referring back to FIG. 1, the operating signal (CSR∅) is provided by one of the interface boards 27 via the input isolator circuit 24 to a monitor circuit 71 contained therein. The monitor 71 provides an output disable (OD) signal to the output isolator/driver circuits 25 and 26 via the input isolator 24. Referring more specifically to FIG. 2 and FIG. 5, the monitor circuit 71 comprises two monostable timers 72 and 73 which can be, for example, 555 timers wired to operate in a monostable mode. The monitor 71 operates by receiving the operating signal (CSR∅) when asserted by the ISC clock interrupt program at 69. The signal is applied to one side of a capacitor 74, the other end of which is connected to the anode of a diode 75, a resistor 76 and the trigger input (TR) of the first timer 72. The cathode of the diode 75 and the other end of the resistor 76, as well as a timing resistor 77 and the reset (R) and power (V) terminals of the first timer 72, are connected to a source of positive voltage V. The other end of the timing resistor 77 and a timing capacitor 78 are connected to the threshold (TH) and discharge (D) terminals of the first timer 72. The other end of the timing capacitor 78 is connected to ground. A bypass capacitor 79 is connected from the control voltage terminal (CV) of the first timer 72 to ground for noise immunity. The capacitor 74 and the resistor 76 form a pulse differentiator and the diode 75 clamps positive excursions to the positive voltage level V. When the operating signal (CSR∅) applied to the capacitor 74 is set while the other side at node A is held high, there is no charge on the capacitor 74. However, when the operating signal (CSR∅) is reset at a time t(0) by the ISC main program at 57, node A goes to logic ∅ and the capacitor 74 begins charging. Going to logic ∅ also triggers the first timer 72 so that its output B goes to logic 1. At the same time, the timing capacitor 78, which had been held discharged, begins to charge as indicated by the dashed line C(t). When the timing capacitor 78 charges to approximately two-thirds of the source voltage V after a time period T3 of approximately 100 microseconds, the output B of the first timer 72 returns to a logic ∅. Thus, the output B of the first timer 72 goes to a logic 1 and then returns to a logic ∅ to provide a detection pulse 20.

The output B of the first timer 72 is connected to an inverter 81, the other end of which is connected to the threshold (TH) and trigger (TR) terminals of the second timer 73 along with a timing resistor 82 and a timing capacitor 83. The other end of the timing resistor 82, as well as the reset (R) and power (V) terminals of the second timer 73, are connected to the source of positive voltage V. The other end of the timing capacitor 83 and a bypass capacitor 84 are connected to ground, the other end of the bypass capacitor 84 being connected to the control voltage terminal (CV) of the second timer 73. When the output B of the timer 72 goes to logic 1, the output of the inverter 81 at node C goes to logic ∅ which triggers the second timer 73 and causes its output, the output disable signal (OD), to go to logic 1 at the time t(0). Thus, the monitor 71 is turned on at the time t(0) when the first operating signal (CSR∅) is reset. At the same time, the timing capacitor 83 begins to charge. The values of the timing resistor 82 and the timing capacitor 83 are selected to provide a time period T4 shorter than the duration of the load signal (LS) from the ISCs. With respect to the ten-section machine example where the load signals (LS) are approximately 500 milliseconds, the time period T4 of the preferred embodment is approximately 100 milliseconds. Since the time delay T2 between operating pulses is substantially less than the charging time period T4, approximately 14 milliseconds as calculated in the example above, the timing capacitor 83 discharges at a time t(1) because the reference voltage at the node C goes back to logic ∅ when the output B of the first timer 72 goes to a logic 1. Since the timing capacitor 83 discharges well before reaching the voltage level required to reset the second timer 73, the output disable signal (OD) remains at logic 1.

The monitor 71 stays on with the output disable signal (OD) at logic 1 until after the ISC-1 21 stalls with the operating signal (CSR∅) either set or reset. In the absence of the negative-going, lagging edge of the operating signal (CSR∅) being reset, the timing capacitor 83 will continue to charge until it reaches approximately two-thirds the value of the positive voltage V after the charging time period T4 has expired at a time t(3). At that time, the output disable (OD) signal is returned to logic ∅. Going back to the example, even if ISC-1 21 stalls at time t(2) just before its load signal (LS-1) was going to turned off, the monitor 71 would detect the stall within the time period T4 and turn off at the time t(3) approximately 100 milliseconds into the 500 millisecond gob-load period for the ISC-2. When the monitor 71 turns off, the output signal (OD) goes to logic ∅ and inhibits the load signal (LS-1) from the ISC-2 so that the gob load signal (GLS) also turns off at the time t(3). As a result, the gob solenoid 46 is deenergized causing the gob flipper 53 to extend and deflect the gob 32 to prevent delivery when the operator did not expect it.

Figure 6:
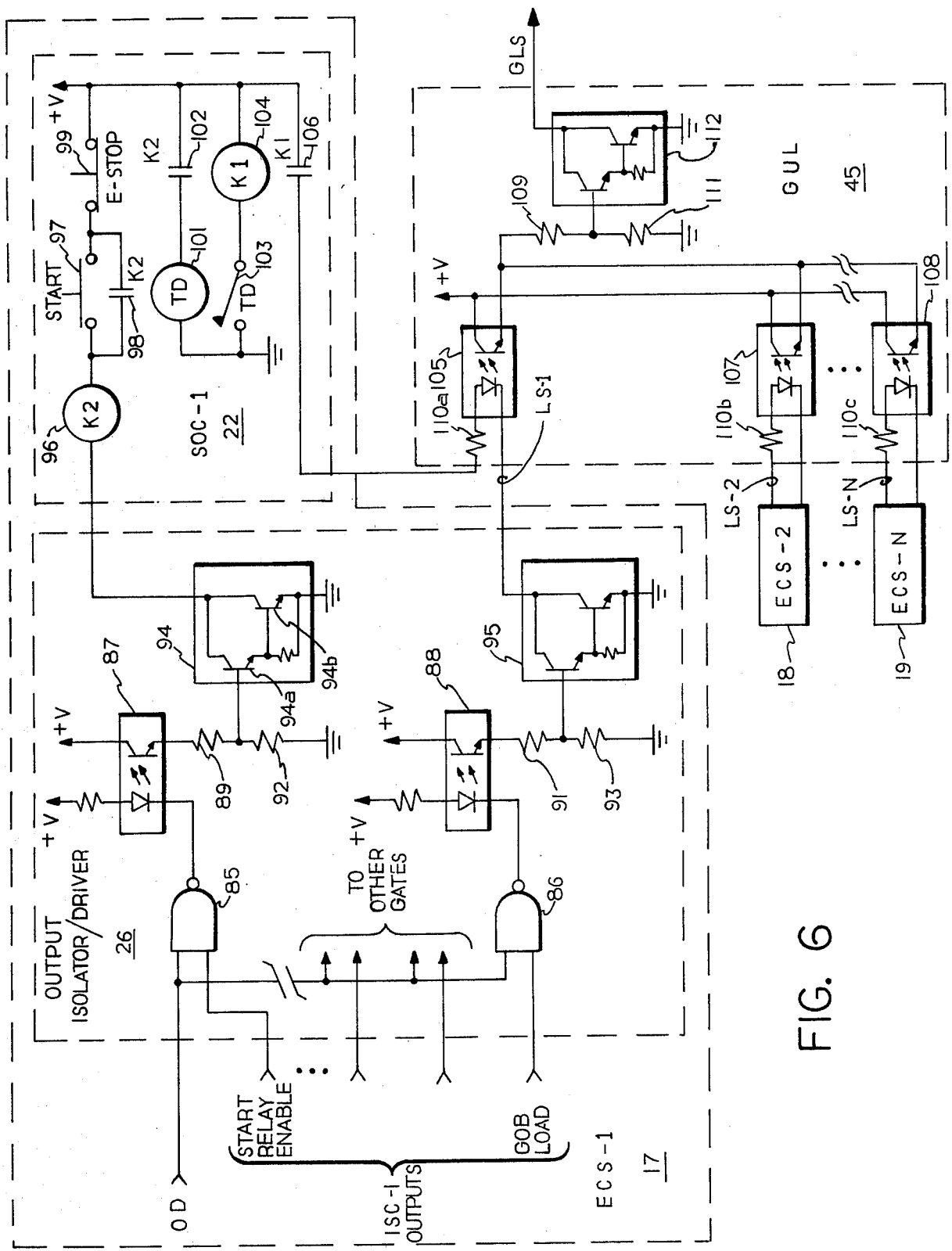
FIG. 6 is an electric schematic of a portion of the output isolator/driver, the section operator console and the gob load unit shown as blocks in FIG. 1 in accordance with the invention.

As already mentioned, the output of the monitor 71 is wired to each of the output isolator/driver circuits 25 and 26 for providing the output disable (OD) signal thereto. All of the outputs from the ISC-1 21 are isolated from the SOC-1 22 by opto-isolators contained in the output isolator/driver circuits 25 and 26. Referring more specifically to FIG. 6, one of the output circuits 26 is shown and only two of a plurality of outputs from the ISC-121 are shown, i.e., the start relay enable output and the gob load output. Each output is connected to one input of a NAND gate 85 and 86, respectively, the outputs of which are connected to the cathode-inputs of LED-phototransistors 87 and 88, respectively. The other output of each NAND gate 85 and 86 is connected to the output OD of the second timer 73. The emitter-outputs of the LED-phototransistors 87 and 88 are connected to resistors 89 and 91, respectively, the other ends of which are connected to grounded resistors 92 and 93 and driver circuits 94 and 95, respectively. The driver circuits 94 and 95 can be, for example, a pair of Darlington connected transistors 94a and 94b. The output from the start-relay enable driver 94, as well as all the other outputs except that from the gob load driver 95, is wired to the SOC-1 22 and provides a path to ground for a start relay 96 contained therein. The other end of the start relay 96 is connected to normally-open start switch 97 and a normally-open pair of contacts 98, the other ends of both being serially connected through a normally closed E-stop switch 99 to a source of positive voltage V. A time delay relay 101 is connected in series with another pair of contacts 102 between ground and the positive source of voltage V. Both pairs of K2 contacts 98 and 102 are actuated to a closed position when the K2 start relay 96 is energized. A time-delay switch 103 is connected in series with a power relay 104 between ground and the positive source of voltage V. The time-delay switch 103 is actuated to a closed position when the time-delay relay 101 is energized and released to an open position approximately two seconds after the time-delay relay 101 is deenergized. The output of the gob load driver 95 is wired to the GLU 45 and is connected to the cathode input of an LED-phototransistor 105, the other end of which is connected in series with a current-limiting resistor 110a and a pair of normally-open contacts 106 in the SOC-1 22 to the source of positive voltage. The pair of K1 contacts 106 are actuated to a closed position when the K1 power delay 104 is energized. The output of the gob load driver 95 provides the load signal (LS-1) to the GLU 45 in the form of a path to ground. ECS-2 through ECS-N also provide load signals (LS-2 through LS-N, respectively) to LED-phototransistors 107 and 108 throigh serially connected resistors 110b and 110c in the GLU 45 in a similar fashion. The outputs of the LED-phototransistors 105, 107 and 108 are connected in parallel between a source of positive voltage V and a pair of serially connected resistors 109 and 111, the latter being grounded. The junction between the resistors 109 and 111 is connected to the input of a driver circuit 112, the output of which provides the gob load signal (GLS) signal in the form of a path to ground.

The output disable (OD) signal controls the mode of the outputs of the ISC-1 21 according to the following table:

TABLE

| MODE | OD | ISC-1 OUTPUTS | NAND OUTPUT |
| --- | --- | --- | --- |
| INHIBIT: Monitor 71 OFF, ISC-1 stalled | 0 | 0 | 1 |
|  | 0 | 1 | 1 |
| ENABLE: Monitor 71 ON, ISC-1 running | 1 | 0 | 1 |
|  | 1 | 1 | 0 |

When the monitor 71 is ON and the output disable (OD) signal is a logic 1, it enables all of the outputs from the ISC-1 21 to the SOC-1 22, as well as the gob load output to the GLU 45. Thus, when a logic 1 is presented by the start-relay enable output of the ISC-1 21 to the NAND gate 85 causing its output to go low, the LED of the LED-phototransistor 87 illuminates and turns on the phototransistor. As a result of the voltage drop across the resistors 89 and 92, current flows from the driver 94 so that its output provides a path to ground to energize the K2 start relay 96. Assuming that the start button 97 is subsequently depressed, the energized start relay 96 closes both pairs of K2 contacts 98 and 102 to energize the time delay relay 101 which closes the time-delay switch 103 to energize the power relay 104. The power relay 104 closes the pair of K1 contacts 106 which connect the source of positive voltage V to the anode-input of the LED-phototransistor 105 in the GLU 45. Furthermore, when a logic 1 is presented by the gob load output of the ISC-1 21 to the NAND gate 87 causing its output to go low, the LED-phototransistor 88 is also energized so that the output of its driver 95 provides the load signal (LS-1) in the form of a path to ground for the cathode-input of the LED-phototransistor 105 in the GLU 45. As a result, the emitter-output of the LED-phototransistor 105 provides a path to ground from the supply of positive voltage V through the resistor 109 and 111 so that the driver 112 of the GLU 45 conducts to provide the gob load signal (GLS) in the form of a path to ground. Any of the other electronic control systems, ECS-2 18 through ECS-N 19, function in the same fashion to provide a corresponding load signal (LS-2 through LS-N, respectively) from which the gob load signal (GLS) output is derived.

In the event of a stall in the ISC-1 21, the monitor 71 turns OFF and the output disable (OD) signal goes to a logic Ø as described above to inhibit all of the outputs from the ISC-1 21 to the SOC-1 22, as well as the gob load output to the GLU 45. Thus, when a logic Ø is presented to the NAND gate 85, the LED-phototransistor 87 is deenergized so that the output of the driver 94 no longer provides a path to ground causing the start relay 96 to drop out. However, even though the pair of K2 contacts 102 opens, the time delay relay 101 holds the time delay switch 103 closed for approximately two seconds to keep the power relay 104 energized so that all the forming mechanisms 16 receive power to return to a safe position for the operator as required by the SAFE condition. The unfortunate problem that existed before the use of the monitor 71 was that the pair of K1 contacts 106 also remained closed for two seconds to keep the LED-phototransistor 105 energized by the source of positive voltage V. As a result, the gob load signal (GLS) stayed on for two seconds. However, use of the monitor 71 provides the output disable (OD) signal which detects the stall of an ISC. Thus, when the output disable (OD) signal becomes a logic Ø the output of the NAND gate 86 will always be a logic 1, regardless of the gob load output, to deenergize the LED-transistor 88 so that the output of the driver 95 no longer provides the load signal (LS-1) or the path to ground for the cathode-input of the LED-phototransistor 105. As a result, the LED-phototransistor 105 immediately deenergizes so that the output of the driver 112 no longer provides the gob load signal (GLS) output in the form of a path to ground for the gob load solenoid 46. Therefore, the monitor 71 ensures that the gob flipper 53 will extend and deflect the gob 32 to prevents its delivery and serious injury to the operator.

It will be apparent that various changes may be made in the details of construction from those shown in the attached drawings and discussed in conjunction therewith without departing from the spirit and scope of this invention. It is, therefore, to be understood that this invention is not to be limited to the specific details shown and described.

What we claim is:

1. An improved electronic control system in a glassware forming machine, the machine having a plurality of individual glassware forming sections each having a plurality of glassware forming mechanisms, means for feeding and sequentially distributing gobs of molten glass to each of the individual sections in an ordered sequence over one machine cycle consisting of a fixed number of clock pulses, means to form the gobs into glassware articles by cycling the forming mechanisms in a predetermined sequence of forming steps, an electronic control system associated with each individual section and responsive to each clock pulse for providing a load signal (LS) and a plurality of forming signals to actuate the forming mechanisms during the machine cycle, a circuit for providing a gob load signal (GLS) in response to a load signal (LS) from any one of the electronic control systems, means responsive to the absence of a gob load signal (GLS) for deflecting a gob to prevent it from being distributed to an individual section next in sequence to be fed, each electronic control system comprising:

operating means for providing an operation pulse each time the control system provides a plurality of forming signals to the forming mechanisms;

means responsive to said operating means for providing a monitoring signal (OD) at a first binary state when a first one of said operation pulses is applied thereto and changing to the second binary state if no operation pulse occurs within a predetermined stall-period of time after said first operation pulse; and means responsive to said monitoring means for enabling the load signal (LS) and the forming signals when said monitoring signal (OD) is at the first binary state and for inhibiting the load signal (LS)

and the forming signals when said monitoring signal (OD) is at the second binary state so that the gobs of molten glass will not be distributed to the individual sections and the forming mechanisms will return to a safe condition.

2. An improved electronic control system in a glassware forming machine, the machine having a plurality of individual glassware forming sections each having a plurality of glassware forming mechanisms, means for feeding and sequentially distributing gobs of molten glass to each of the individual sections in an ordered sequence over one machine cycle consisting of a fixed number of clock pulses, means to form the gobs into glassware articles by cycling the forming mechanisms in a predetermined sequence of forming steps, an electronic control system associated with each individual section and responsive to each clock pulse for providing a load signal (LS) and a plurality of forming signals to actuate the forming mechanisms during the machine cycle, a circuit for providing a gob load signal (GLS) in response to a load signal (LS) from any one of the electronic control systems, means responsive to the absence of a gob load signal (GLS) for deflecting a gob to prevent it from being distributed to an individual section next in sequence to be fed, each electronic control system comprising:

operating means for setting an operating signal (CSRØ) each time the electronic control system provides a plurality of forming signals to the forming mechanisms and then resetting said operating signal (CSRØ);

means responsive to said operating means for providing a monitoring signal (OD) at a first binary state when a first one of said operating signals (CSRØ) is reset and changing to the second binary state if no reset of an operating signal (CSRØ) occurs within a predetermined stall-period of time after said first operating signal; and means responsive to said monitoring means for enabling the load signal (LS) and the forming signals when said monitoring signal (OD) is at the first binary state and for inhibiting the load signal (LS) and the forming signal when said monitoring signal (OD) is at the second binary state so that the gobs of molten glass will not be distributed to the individual section next in sequence and the forming mechanisms will return to a safe condition.

3. An electronic control system as recited in claim 2 further comprising a computer containing a program responsive to each clock pulse for generating a plurality of outputs including a gob load output to provide the load signal (LS) and forming outputs to provide the forming signals and wherein said operating means comprises a first instruction within the program and means responsive thereto for setting said operating signal (CSRØ) and a second instruction within the program and means responsive thereto for resetting said operating signal (CSRØ).

4. An electronic control system as recited in claim 3 wherein said monitoring means comprises:

means responsive to said operating means for providing a positive detection pulse each time said operating signal (CSRØ) is reset;

an inverter having an input connected to said detection means and responsive to the detection pulse, said inverter having an output for providing an inverted detection pulse; and a monostable timer having a threshold and trigger input connected to the output of said inverter, as well as to a timing resistor and a grounded timing capacitor having a time constant defining said stall-period to be less the duration of the load signal (LS) but greater than the delay time between said operating signals (CSRØ), the other end of said timing resistor being connected to a source of positive voltage, and an output for providing said monitoring signal (OD) at the first binary state when said inverter provides a first inverted detection pulse to trigger said timer and changing to the second binary state if said inverter fails to provide a subsequent inverted detection pulse to discharge said timing capacitor within said stall-period to reset said timer.

5. An electronic control system as recited in claim 4 wherein said enabling means comprises a plurality of NAND gates, each one of said NAND gates having a first input connected to the output of said timer and a second input connected to an associated one of the outputs of the computer, one of said NAND gates having an output for providing the load signal (LS) and each one of said other NAND gates having an output for providing the associated one of forming signals.

6. An electronic control system as recited in claim 4 wherein said detection means comprises a pulse differentiator having an output and an input connected to said operating means and responsive to said operating signal (CSRØ) each time it is reset, and a monostable timer having a trigger input connected to the output of said pulse differentiator, a threshold and discharge input connected to a timing resistor and a grounded timing capacitor defining the period of the detection pulse, the other end of said timing resistor being connected to a source of positive voltage, and an output for providing the detection pulse to said inverter.

7. An electronic control system as recited in claim 6 wherein said pulse differentiator comprises a capacitor having one end connected to said operating means and the other end connected to the trigger terminal of said timer, a diode having the cathode connected to a source of positive voltage and the anode connected to the trigger terminal of said timer, and a resistor connected in parallel with said diode.

8. A method of controlling a machine for forming articles of glassware, wherein the machine has a plurality of individual glassware forming mechanisms, with means for feeding and sequentially distributing gobs of molten glass to each of the individual sections in an ordered sequence over one machine cycle consisting of a fixed number of clock pulses to form the gobs into glassware articles by cycling the forming mechanisms in a predetermined sequence of forming steps, and an electronic control system associated with each individual section having a computer containing a program responsive to each clock pulse for generating a plurality of outputs including a gob loading output to provide a load signal (LS) and forming outputs to provide a plurality of forming signals to actuate the forming mechanisms during the machine cycle, with a circuit for providing a gob load signal (GLS) in response to a load signal (LS) from any one of the control systems, and means responsive to the absence of a gob load signal (GLS) for deflecting a gob to prevent it from being distributed to an individual section, the improvement in the method comprising the steps of:

initiating an operating signal (CSR0) by the computer each time the control system provides a plurality of forming signals to the forming mechanisms;

resetting the operating signal (CRS0) by the computer when in operation;

providing a monitor signal (OD) at a first binary state when a first one of the operating signals (CSR0) is reset;

changing the monitor signal (OD) to the second binary state if no reset of an operating signal (CSR0) occurs within a predetermined stall-period of time after the first operating signal;

enabling the load signal (LS) and the forming signals when the monitoring signal (OD) is at the first binary state; and inhibiting the load signal (LS) and the forming signals when the monitoring signal (OD) is at the second binary state.

9. A method as recited in claim 8 wherein the step of providing a monitoring signal (OD) at the first binary state includes the steps of; providing a positive detection pulse each time an operating signal (CSR0) is reset, inverting the detection pulse, and applying the inverted detection pulse to the threshold and trigger input of a monostable timer, as well as to a timing resistor and a grounded timing capacitor of the timer having a time constant defining the stall-period, so that the output of the timer is set to provide a monitor signal (OD) at a first binary state.

10. A method as recited in claim 9 wherein the step of changing the monitor signal (OD) to the second binary state includes the steps of; adjusting the timer constant of the timing resistor and the timing capacitor to be less than the duration of the load signal (LS) but greater than the time delay between operating signals (CSR0) and preventing inverted detection pulses from being applied to the threshold and trigger input of the timer within the stall-period so that the output of the timer is changed to the second binary state.

* * * * *